United States Patent [19]

Meeker et al.

[11] Patent Number: 4,557,683
[45] Date of Patent: Dec. 10, 1985

[54] ROTARY PLASTICATOR RAM INJECTION MACHINE

[75] Inventors: Gregory W. Meeker, Webster; Norris E. Bleck, Rochester, both of N.Y.

[73] Assignee: USM Corporation, Farmington, Conn.

[21] Appl. No.: 612,678

[22] Filed: May 22, 1984

[51] Int. Cl.[4] .............................................. B28B 13/00
[52] U.S. Cl. ............................. 425/147; 264/328.19; 366/76; 366/78; 425/149; 425/209; 425/557; 425/559; 425/562; 425/569; 425/376 B
[58] Field of Search .................. 425/147, 192 R, 204, 425/209, 374, 376 R, 376 B, 466, 569, 146, 149, 557, 559, 562; 366/76, 77, 78, 79; 264/328.19

[56] References Cited

U.S. PATENT DOCUMENTS 3,596,326  8/1971  Annis et al. ........................ 425/192
4,073,944  2/1978  Dawson ............................... 425/146
4,389,358  6/1983  Hendry ............................ 264/328.19
4,421,412 12/1983  Hold et al. ......................... 425/466
4,422,812 12/1983  Monnet ................................. 366/76
4,511,319  4/1985  Takayama ........................... 425/147

Primary Examiner—Jay H. Woo
Assistant Examiner—Timothy W. Heitbrink
Attorney, Agent, or Firm—Aubrey C. Brine

[57] ABSTRACT

The output of a plastic or polymeric material processor is fed through a three-way valve to an expandable chamber in a barrel having a ram therein. When the chamber has a predetermined charge the valve is shifted to direct the output of the plasticator to an accumulator. Operation of the ram injects the material into a mold cavity and thereafter the valve shifts to direct the combined output of the plasticator and the accumulator to recharge the chamber.

8 Claims, 10 Drawing Figures

4,557,683

ROTARY PLASTICATOR RAM INJECTION MACHINE

FIELD OF THE INVENTION

This invention relates to machines for plasticating and injection molding plastic and polymeric material.

BACKGROUND OF THE PRIOR ART

In the field of injection molding plastic and/or polymeric material it is known to melt, mix and otherwise process such material by feeding granular material to a screw rotating in a barrel. The screw flights are usually differentially dimensioned to melt the solid plastic and otherwise process and pump the material in liquid form toward an outlet connected to the cavity of a mold. The flights of the screw have various configurations so as to perform a variety of operations and may be more than twenty times the diameter in length. Such a machine is shown in U.S. Pat. No. 3,596,326.

As the material is melted, it is pumped past a non-return valve to a expandable chamber and the screw is forced axially back until a predetermined charge is in the chamber. Rotation of the screw is stopped and the screw is forced toward a nozzle injecting the charge into the mold cavity where the material is cooled or otherwise reacted to solidify in the cavity to form a desired article.

As should be apparent the length of the screw need to perform the desired operations to plasticate and process the material as well as the length of machine needed to accommodate the reciprocation of the screw dictates that such reciprocating screw injection molding machines be of considerable length.

There has been recently developed by the Farrel Division of USM Corporation an apparatus known as the DISKPACK Processor for processing plastic material with greater efficiency than the screw of an extruder or injection molding machine. Such an apparatus is typically shown and described in U.S. Pat. Nos. 4,142,805, 4,329,065 and 4,227,816. These patents show a multi-stage rotary processor for plastic and polymeric materials which are or become in the course of processing viscous liquids. An annular housing rotatably receives a rotor having in its cylindrical surface a plurality of annular channels forming with the close fitting housing a plurality of processing passages. Transfer passages conduct the material from each passage after processing and finally to a relatively narrow and deep channel which provides pumping pressure to force the processed material from an outlet which may be a die for shape extrusion or which may conduct the material for further processing in another device.

In copending application for U.S. Patent Ser. No. 612,682, filed May 22, 1984, there is shown a combination of the plasticating unit known as the DISKPACK Processor and a screw in a sleeve reciprocable in a barrel. The processor acts to melt or otherwise process material to be molded and the screw feeds the processed material to a chamber in the barrel at the end of the screw/sleeve combination. The chamber expands as the screw/sleeve is forced back by the plastic fed into the chamber. When the chamber has received a predetermined charge, the processor and screw are stopped and the unit is moved forward to eject the material from the chamber into the mold cavity. The plasticator comprises a rotor having channels in its cylindrical surface and being rotated in an annular housing. In normal operation, the walls of the channels drag the material toward fixed blocks which restrain the material so as to be processed by shear forces and direct the material from channel to channel and thence to the screw. For certain materials it may be undesirable to stop the rotor during injection due to possible degradation of the material until the rotor again is moved.

SUMMARY OF THE INVENTION

Accordingly, it is an object of the invention to provide continuous operation of the DISKPACK Processor with intermittent operation of the injection unit being permitted by acceptance of the continuously plasticated material into an accumulator. To this end the output of the processor is fed through a three-way valve which directs the material from the plasticator to the end of the pumping screw. When the barrel chamber is full with a predetermined charge, the three way valve directs the output of the processor to an accumulator and the screw is driven forward to inject the material in the chamber into the mold cavity. After injection, the three-way valve is returned to its initial condition and the material from the accumulator and the processor are combined and fed to the screw.

In another aspect of the invention, the material from the processor and the accumulator are fed directly into a chamber in front of a ram in place of a screw. The plasticator unit can be mounted fixedly to the barrel with the three-way valve interposed. In this aspect of the invention, only the ram is reciprocated and only the processor rotor is rotated.

DESCRIPTION OF THE PREFERRED EMBODIMENT

Figure 1:
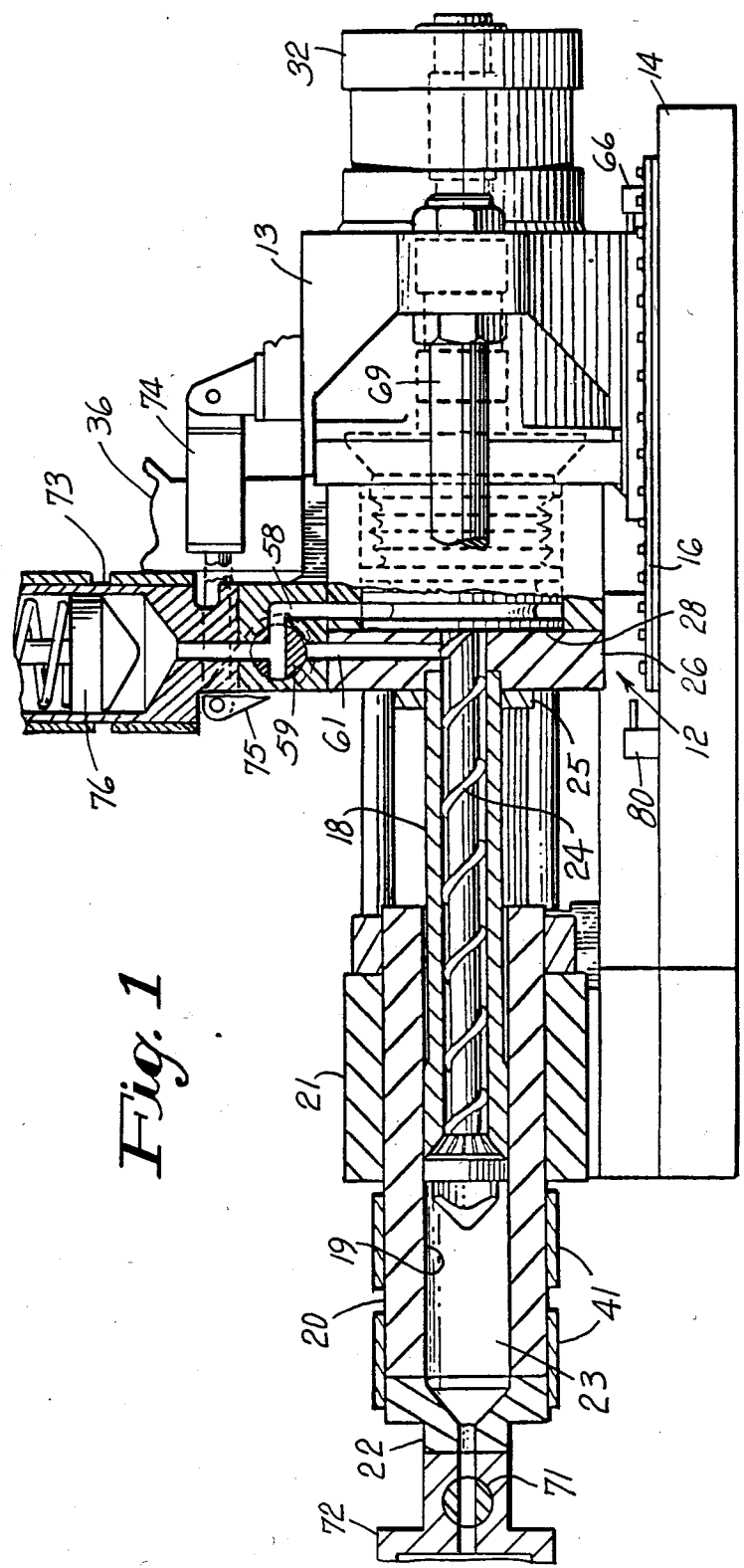
FIG. 1 is a diagrammatic side elevation of an injection molding machine embodying the invention.
Figure 2:
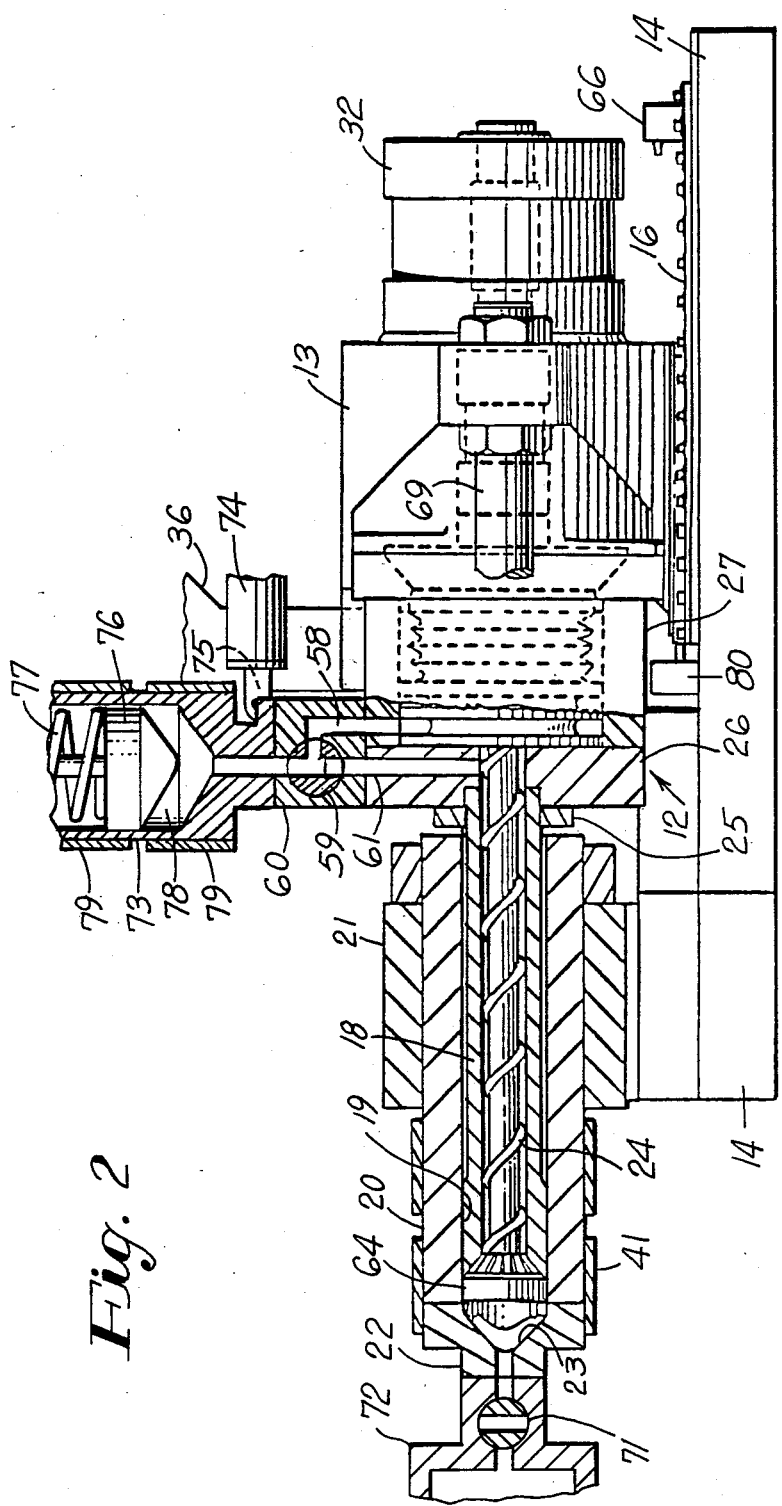
FIG. 2 is a view similar to FIG. 1 with various parts in different positions.
Figure 3:
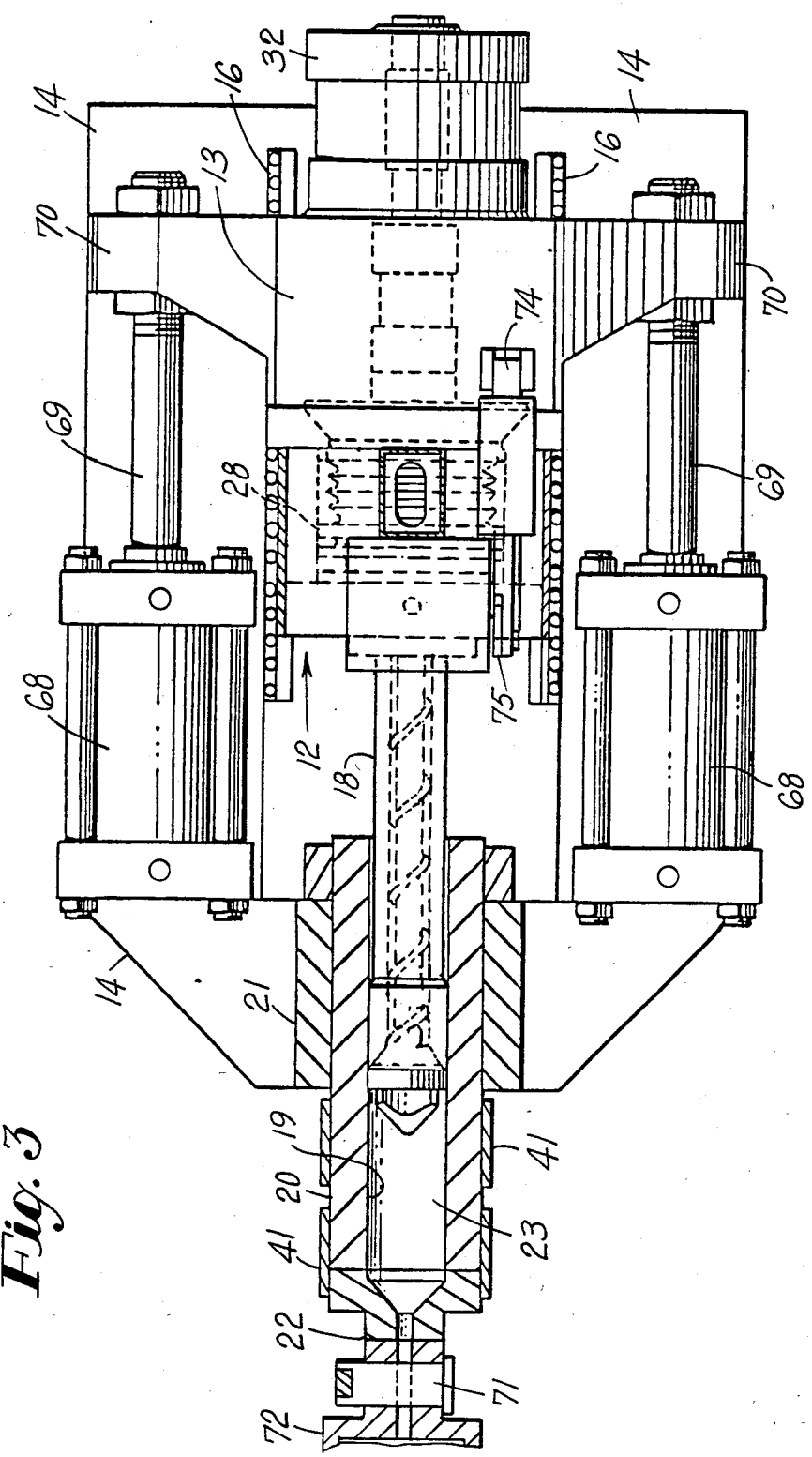
FIG. 3 is a plan view of the machine shown in FIG. 1.
Figure 4:
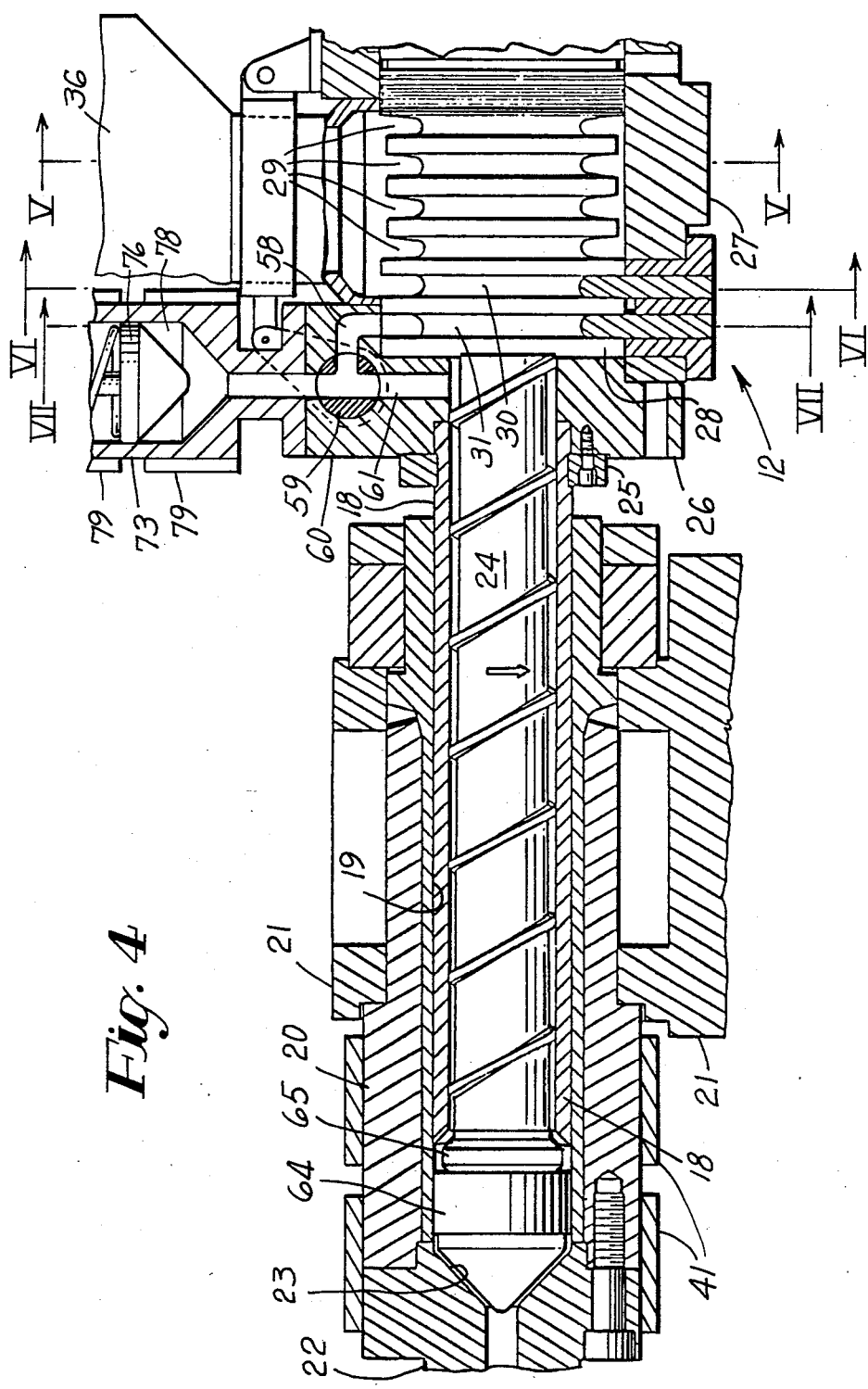
FIG. 4 is a side elevation in enlarged scale of a part of the mechanisms shown in FIG. 1.

Referring to FIGS. 1-3 there is shown an injection molding machine comprising a plasticating unit 12 mounted on a bracket 13 guided for reciprocation in guideways 16 on a base 14. The unit 12 has secured thereto a sleeve 18 which at one end is mounted for reciprocation in a bore 19 in a barrel 20 secured to the base through a bracket 21. The barrel is provided with a nozzle 22 which provides communication between the bore 19 and a cavity of a mold 72. A valve 71 between the nozzle and the mold controls the communication as will appear. As best seen in FIG. 4, the sleeve 18 is secured by a split ring 25 to a cap 26 bolted to one end of an annular housing 27 of the plasticator unit 12.

The plasticator unit includes the annular housing 27 secured by bolts (not shown) to the bracket 13. The housing rotatably receives a rotor 28 having in its cylindrical surface a plurality of annular channels 29, 30 and 31 which with the relatively close fitting housing 27 form processing passages. The rotor 28 is driven in rotation by a suitable motor 32 which may be hydraulic, electric, or any other suitable type without departing from the scope of the invention. One end of a screw 24 is fixed to the rotor 28 and is received for rotation in the sleeve 18. At the opposite end the screw is provided with a one-way valve 64, 65. As seen in FIGS. 1-4, the rotation of the motor 32 causes the rotor 28 and screw 24 to be driven in unison. However, means could be provided for driving the rotor and screw separately at different speeds or with one stopped and the other rotated without departing from the scope of the invention. As shown and described in said copending application Ser. No. 612,682, there is provided an injection molding machine in which a similar plasticator and rotor are arranged to be driven intermittently so that the screw and rotor are stopped during injection of plasticated material into a mold cavity. However, certain materials are subject to degradation when the rotor and/or screw are stopped while containing plasticated material. For this reason, the rotor 28 is arranged to be driven continuously for a constant output of plasticated material.

Figure 5:
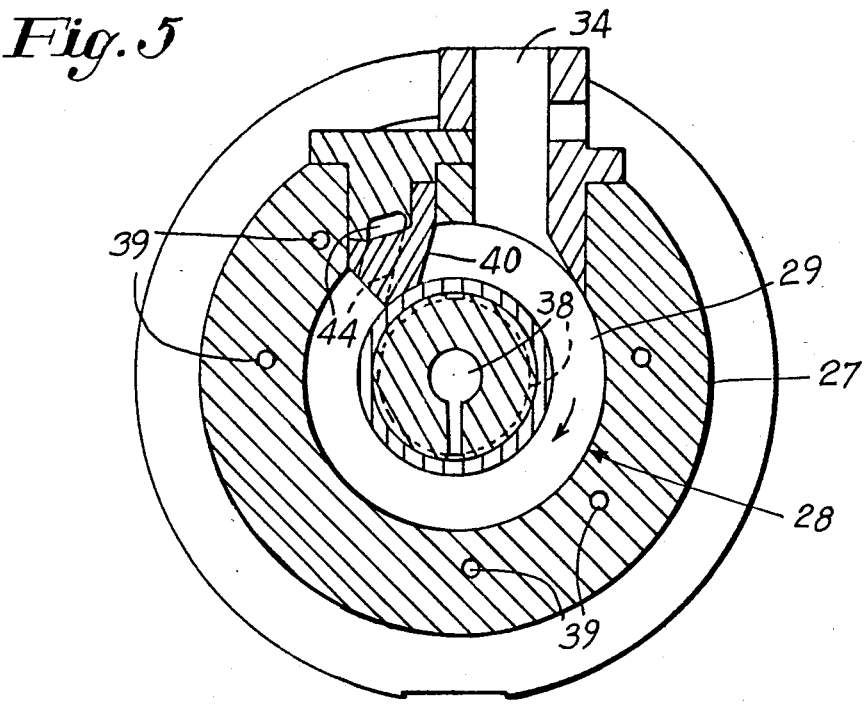
FIG. 5 is a section on line V—V of FIG. 4.

The plasticator housing 27 is provided with an inlet slot 34 (FIG. 5) through which granular plastic or polymeric material is fed from a hopper 36 (FIGS. 1 and 4) to the channels 29. Other means for feeding polymeric material in solid or liquid state may be substituted without departing from the scope of the invention. The rotor and/or housing may be provided with passages 38 and 39 (FIG. 5) for circulation of temperature control fluid and/or heater bands 41 (FIG. 4) typically shown as applied to the barrel to provide temperatures suitable for melting or otherwise processing the material to be plasticated and molded. As the motor 32 rotates the rotor 28, the material to be melted or otherwise processed in the channels 29 is restrained by blocks 40 (FIG. 5) which extend through the housing into each channel 29. Each block 40 has a cross sectional shape and size closely complementary to the channel into which it extends and acts to restrain the material in the channel while the moving walls of the channel drag the material toward the block. Shearing forces at the moving channel walls act on the material for melting or otherwise processing. Each channel block 40 is provided with passages 44 through which melted or processed material passes from one channel 29 to the next.

Figure 6:
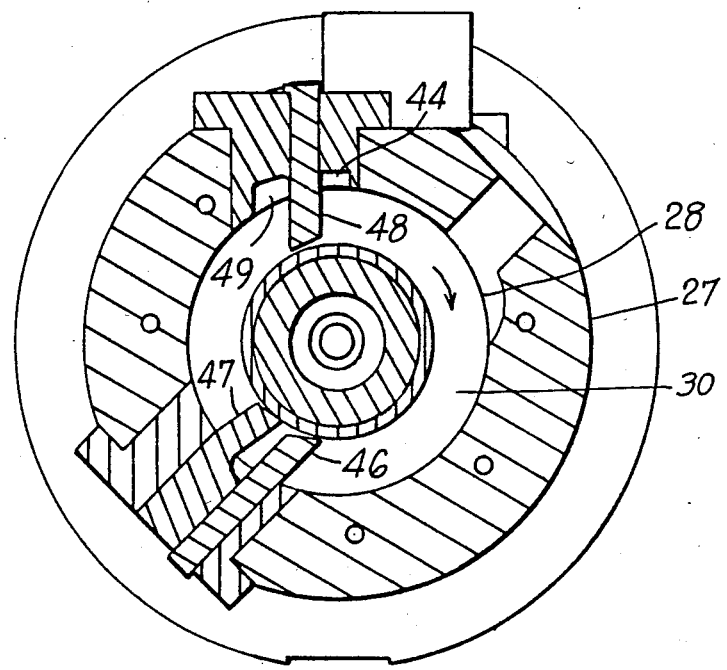
FIG. 6 is a section on line VI—VI of FIG. 4.
Figure 7:
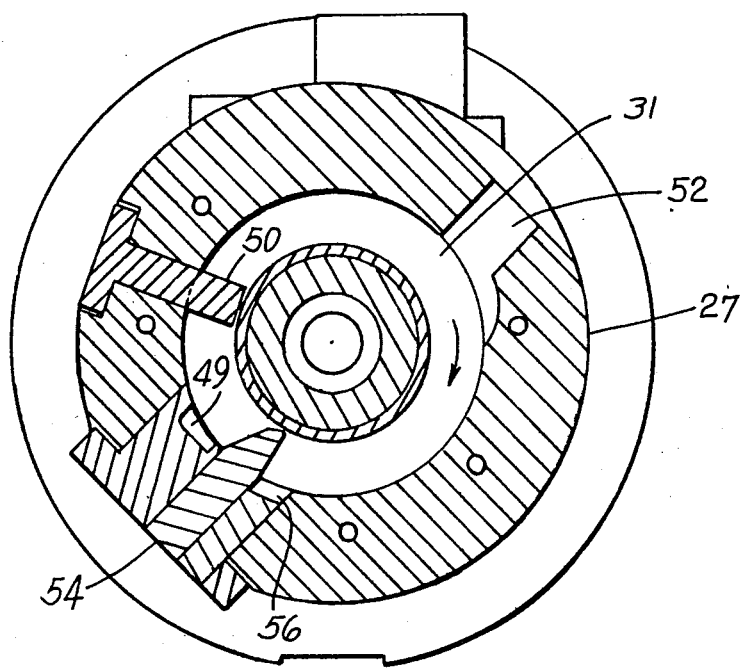
FIG. 7 is a section on line VII—VII of FIG. 4.

The melted material is fed from the last channel 29 into the mixing channel 30 through a passage 44. As seen in FIG. 6, the molten or otherwise processed material engages one or more mixing fingers 46, 47 which spread the material on the walls of channel 30 and otherwise mix the material. A block 48 also extends into channel 30 to direct the mixed material through an exit passage 49 to the venting or devolitilizing channel 31. In channel 31 (FIG. 7) the material is spread on the walls of the channels in thin films by a spreading pin 50 and water or other liquid or gaseous undesirable elements escape from the material and are withdrawn through a port 52. The devolitilized material is scraped from the walls of channel 31 by a channel block 54 and forced through a passage 56 to an outlet 58 (FIG. 4) which leads to one port of a three-way valve 59 in a valve block 60 secured to the upper side of the end cap 26.

As seen in FIG. 2, the three-way valve 59 directs the output of the processor unit 12 to a passage 61 leading to one end of screw 24. As will be seen, material from an accumulator 73 is also fed at this time through the three-way valve 59 to the passage 61. As the rotor 28 and screw 24 continue to rotate, the output of the processor is fed by the screw and through a non-return valve 64 to an expandable chamber 23 at the other end of the screw.

The operation of the plasticator unit 12 is generally described in U.S. Pat. Nos. 4,142,805 and 4,194,841. Typical channel blocks and transfer passages are generally described in U.S. Pat. No. 4,227,816. Typical devolitilizing elements for such processors are described in U.S. Pat. No. 4,329,065. These patents describe in general terms the DISKPACK Processor above referred and are incorporated herein by reference.

As the material is fed by the screw 24 into the expandable chamber 23, the screw 24, the sleeve 18 containing the screw, and the plasticator unit 12 are forced backward from the position seen in FIGS. 2 and 4 to that seen in FIGS. 1 and 3. During this movement the bracket 13 moves in the guideways 16 and the sleeve 18 is guided in the bore 19 of the barrel. When a predetermined charge of plasticated material has been fed to the chamber 23, the bracket actuates a switch 66 (FIGS. 1 and 2) adjustably mounted on the base 14. Actuation of switch 66, causes operation of a solenoid 74 (FIGS. 1-3) which through an arm 75 rotates the valve 59 from the position seen in FIG. 2 to that seen in FIG. 1. The ports in the valve 59 direct the output of the processor 12 into the accumulator 73. A ram 76 in the accumulator cylinder yieldingly opposes entry of the material such as by a spring 77. The valve 59 also closes off the passage 61. At this time the valve 71 opens communication between the chamber 23 and the mold cavity and the cylinders 68 (FIG. 3) operate to move the processor unit 12 and the sleeve 18 to the left as seen in FIGS. 1 and 3 to force the plasticated material into the mold 72. At this time the sleeve, screw and non-return valve act as an injector ram.

During the injection cycle the plasticated material output from the plasticator unit 12 is received in the accumulator chamber 78. Suitable heaters 79 or other temperature control means act to maintain the plasticated material at a non-degradable temperature. At the end of the injection cycle, signalled by actuation of a switch 80, a short holding cycle may commence and the cylinders 68 are then deactivated so as to apply no more than a backpressure, the valve 71 is closed and the valve 59 is returned to the position seen in FIGS. 2 and 4. The material in the accumulator is forced by the ram 76 through the passage 61 to the end of the screw along with the continuing output of the plasticator unit 12. By this combined output of the unit 12 and the accumulator 73 the expandable chamber 23 is quickly filled with the charge for the next "shot" into the mold as predetermined by actuation of switch 66 by the retracting bracket 13.

Figure 8:
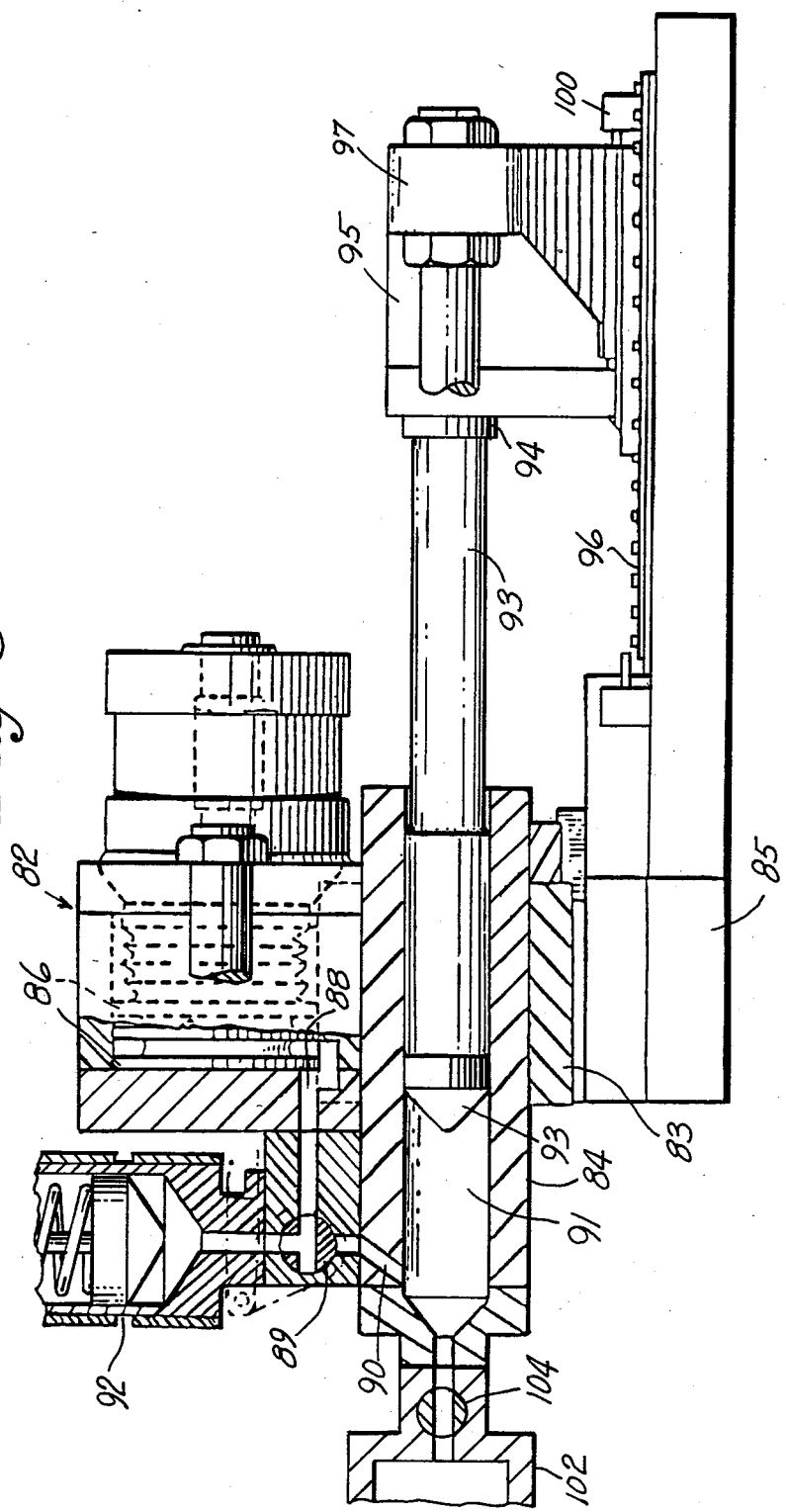
FIG. 8 is a diagrammatic side elevation of another injection molding machine embodying the invention.
Figure 9:
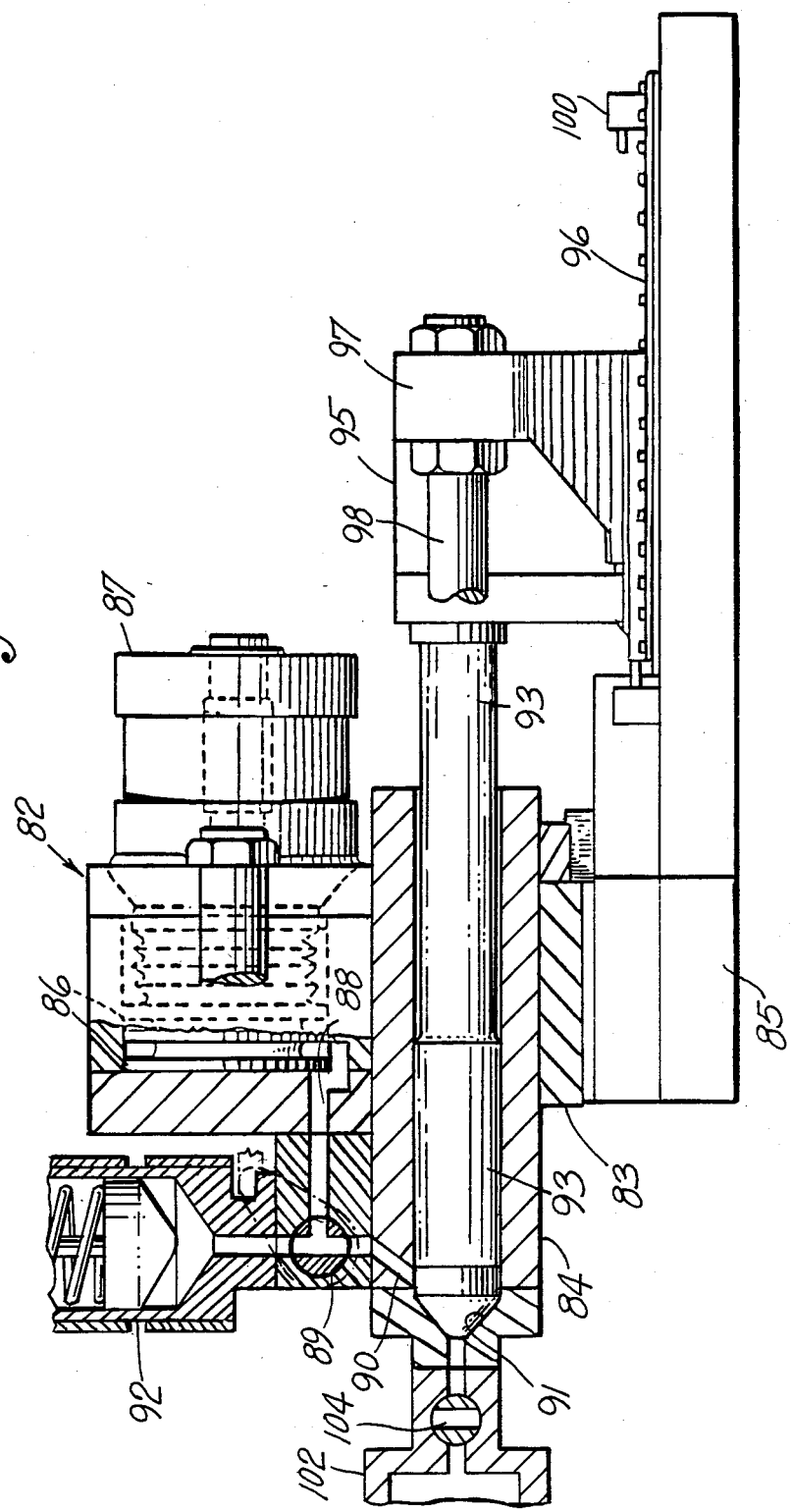
FIG. 9 is a view similar to FIG. 8 with various parts in different positions.
Figure 10:
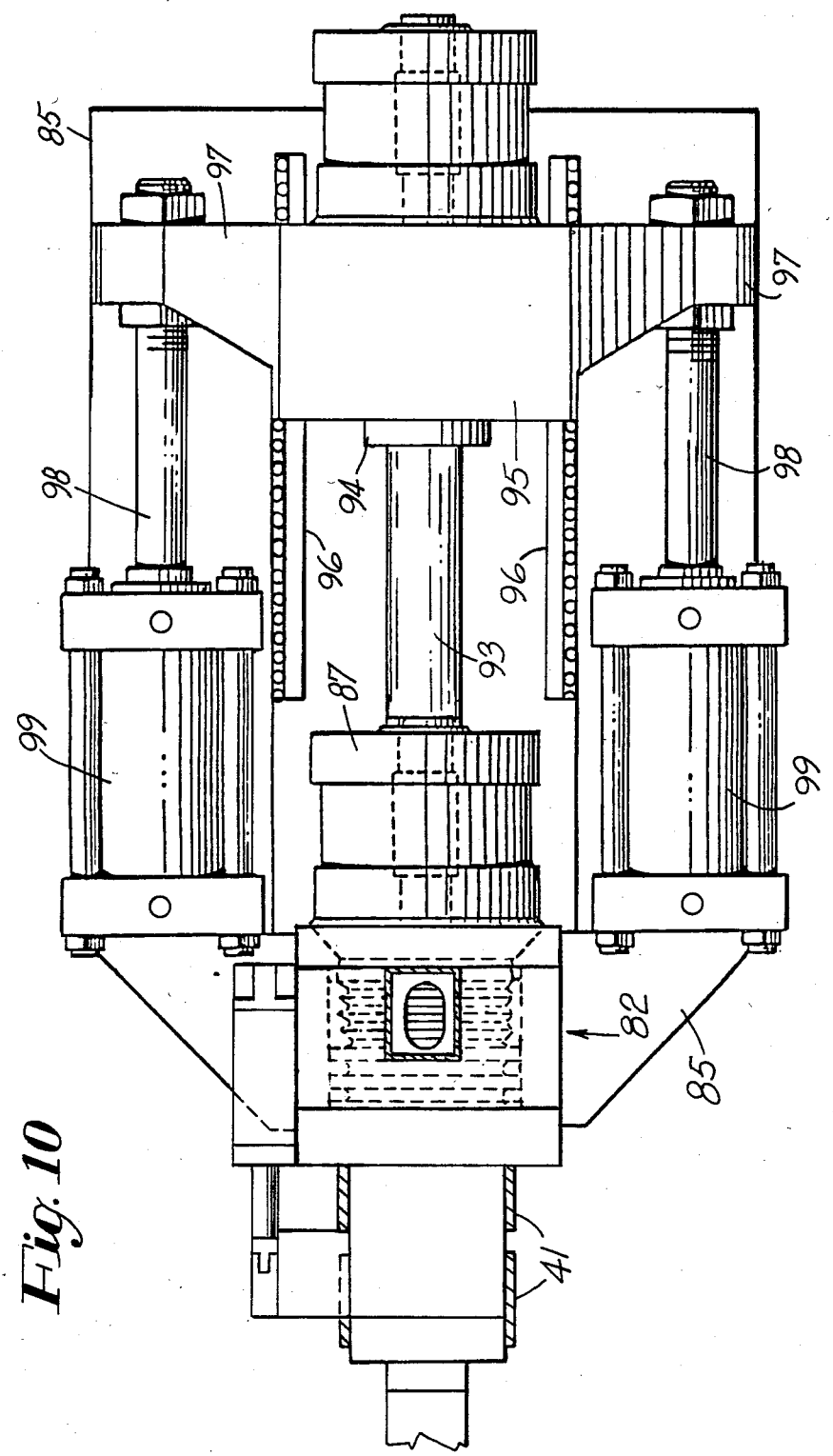
FIG. 10 is a plan view of the machine shown in FIG. 8

Referring to FIGS. 8-10, there is shown an alternate form of machine embodying the invention. As shown, the injection molding machine includes a plasticator unit 82 which is generally similar to the unit 12 previously described so that a description of its function need not be repeated. The unit 82, however, is mounted directly on a bracket 83 in which a barrel 84 is mounted, the bracket being fixed on a base 85. The rotor 86 is driven by a motor 87 in similar fashion as the motor 32.

The output of the processor is directed through a passage 88 to a three-way valve 89 similar to and operated in the same manner as the three-way valve 59. In the starting condition, the valve 89 is in the position seen in FIG. 9 so the output of the processor 80 is directed to a passage 90 leading to an expandable chamber 91 in the barrel 84 and also permits previously plasticated material in an accumulator 92 to be fed to the chamber 91.

As the material is fed to the chamber 91, a ram 93 is forced back in the barrel 84 from the position seen in FIG. 9 to that shown in FIG. 8. The ram 93 is secured at 94 to a bracket 95 mounted for reciprocation on the base 85 by guideways 96. Lugs 97 on bracket 95 are connected to piston rods 98 extending from cylinders 99. During retraction of ram 93, the cylinders are deactivated or apply only a reduced back pressure as is well known in the art. When a predetermined charge has been fed to the chamber 91, the bracket 95 actuates a switch 100 which is adjustable on the base 85 to vary the predetermined charge. Actuation of switch 100 causes the three-way valve 89 to be rotated to the position seen in FIG. 8 so the continuing output of the processor unit 82 is directed to the accumulator 92 and the passage 90 is closed. At this time, the cylinders 99 are pressurized to move the bracket 95 and the ram 93 to the left as seen in FIGS. 8 and 10 to the position seen in FIG. 9 whereby the ram 93 forces the plasticated material from the chamber 91 into the cavity of a mold 102. As is well known in the art holding pressure is maintained on the ram 93 by cylinders 99 while the material in the mold sets to accommodate shrinkage of the material. After the holding period, the valve 104 is closed as seen in FIG. 9 and the three-way 89 valve is returned to the position seen in FIG. 9 and the plasticated material in the accumulator 92 and the output of the plasticator unit 82 are combined in passage 90 and fed to the expandable chamber 91 to start the next cycle.

It should be apparent that substitution of various parts and mechanism may be made without departure from the scope of the invention defined by the claims. Obviously, other types of valves may be substituted for the three-way valve 89.

We claim:

1. Apparatus for injection molding plastic articles including the combination of: a rotary processor for plasticating plastic and polymeric material comprising a rotor mounted for rotation in a housing, the rotor having a plurality of annular channels, which provide moving surfaces of a plurality of annular passages which are closed by a mating surface of the housing, the housing having an inlet through which material to be plasticated is fed into at least one of the passages, and fixed members projecting from the housing into the channels for restraining the material to be acted on by the moving surfaces and to direct the material to successive passages and toward an outlet, and motor means for rotating the rotor for plasticating and otherwise operating on the material fed through the inlet and successive passageways and through the outlet in substantially continuous fashion; an injection unit comprising a barrel, an injector ram reciprocable in the barrel in a first direction to enlarge a chamber at one end of the barrel to receive a predetermined charge of plasticated material and reciprocable in a second direction to force the charge from the chamber into a mold; an accumulator comprising a cylinder having a chamber adapted to receive plasticated material from the processor outlet and a piston in the cylinder biased toward a reduced volume condition in the accumulator chamber so as to receive material from the processor and to force material from the accumulator chamber into the barrel chamber; a valve interconnecting said rotary processor, said injection unit, and said accumulator, said valve in a first condition connecting the outlet of the processor and the accumulator chamber to the barrel chamber and in a second condition closing off the barrel chamber and connecting the outlet of the processor only to the accumulator chamber; and means effective when the barrel chamber has received a predetermined charge, for driving the injector ram in said other direction to force plasticated material from the barrel chamber into the mold whereby said valve in said first condition provides for flow of material to said barrel from both said processor and said accumulator during receiving of a charge of material in said barrel chamber, and said valve in said second condition provides for flow of material only to said accumulator during reciprocation of said ram to force the charge of material into a mold and thereby allow substantially continuous operation of said rotary processor during operation of the apparatus.

2. Apparatus according to claim 1 in which the ram comprises an elongate screw in a sleeve which reciprocates in the barrel.

3. Apparatus according to claim 1 in which the valve is responsive to a predetermined charge being received in the barrel chamber to close off the barrel chamber and to direct the output of the processor to the accumulator and in which the ram is driven to eject the material from the chamber.

4. Apparatus according to claim 2 in which the sleeve is secured to the processor so as to reciprocate in unison therewith and the rotor and screw are rotated simultaneously, the processor being mounted on a bracket guided for reciprocation on the base.

5. Apparatus according to claim 1 in which the ram is carried by a bracket mounted for reciprocation on the base and the processor is fixed on a bracket in which the barrel is secured, the bracket being fixed to the base.

6. Apparatus according to claim 5 in which the valve and the accumulator are also fixed on the bracket in which the barrel is secured.

7. Apparatus according to claim 3 in which the valve is operable at the end of the injection stroke of the ram to return the valve to its initial position to connect the output of the accumulator and the processor to the barrel chamber to recharge the chamber.

8. Apparatus according to claim 5 in which the ram carrying bracket is connected to piston and cylinder means which is responsive to filling of the barrel chamber with a predetermined charge to cause the valve to close off the chamber from the processor and accumulator and to cause the piston and cylinder means to drive the ram to eject the material from the chamber.

* * * * *

REEXAMINATION CERTIFICATE (1074th) United States Patent

Meeker et al.

[11] B1 4,557,683
[45] Certificate Issued  Jun. 6, 1989

[54] ROTARY PLASTICATOR RAM INJECTION MACHINE

[75] Inventors: Gregory W. Meeker, Webster; Norris E. Bleck, Rochester, both of N.Y.

USM Corporation, Farmington, Conn.

Reexamination Request:
No. 90/001,488, Apr. 12, 1988

Reexamination Certificate for:
Patent No.: 4,557,683
Issued: Dec. 10, 1985
Appl. No.: 612,678
Filed: May 22, 1984

[51] Int. Cl.⁴ .............................. B29C 45/02
[52] U.S. Cl. ..................... 425/147; 264/328.19; 366/76; 366/78; 425/149; 425/209; 425/557; 425/559; 425/562; 425/569; 425/376 B
[58] Field of Search ............ 264/328.19; 425/147, 425/192 R, 204, 209, 374, 376 R, 376 B, 145, 466, 569, 146, 149, 557, 559, 562, 244; 366/76, 77, 78, 79, 99

[56] References Cited
U.S. PATENT DOCUMENTS

| 2,881,447 | 4/1959 | Triulzi | 425/557 |
|---|---|---|---|
| 3,089,192 | 5/1963 | Adams | 264/539 |
| 3,127,637 | 4/1964 | Rex | 264/328.19 |
| 3,191,233 | 6/1965 | Linderoth | 425/562 |
| 3,222,717 | 12/1965 | Saslawsky | 425/147 |
| 3,245,115 | 4/1966 | Ecklund | 366/76 |
| 3,256,568 | 6/1966 | Stenger | 425/209 |
| 3,286,303 | 11/1966 | Sherman | 425/149 |
| 3,296,353 | 1/1967 | Nouel | 425/557 |
| 3,372,434 | 3/1968 | Hendry | 366/78 |
| 3,596,326 | 8/1971 | Annis | 425/192 R |
| 3,679,341 | 7/1972 | Graybill | 425/244 |
| 3,913,796 | 10/1975 | Aoki | 222/238 |
| 3,937,447 | 2/1976 | Alwes | 259/191 |
| 4,014,524 | 3/1977 | Klingebiel | 259/6 |
| 4,073,944 | 2/1978 | Dawson | 425/146 |
| 4,227,816 | 10/1980 | Hold | 366/99 |
| 4,290,701 | 9/1981 | Schad | 366/77 |
| 4,389,358 | 6/1983 | Hendry | 264/45.1 |
| 4,421,412 | 12/1983 | Hold | 366/76 |
| 4,422,842 | 12/1983 | Monnet | 366/78 |
| 4,511,319 | 4/1985 | Takayama | 425/145 |

Primary Examiner—Jay H. Woo
Assistant Examiner—Timothy W. Heitbrink

[57] ABSTRACT

The output of a plastic or polymeric material processor is fed through a three-way valve to an expandable chamber in a barrel having a ram therein. When the chamber has a predetermined charge the valve is shifted to direct the output of the plasticator to an accumulator. Operation of the ram injects the material into a mold cavity and thereafter the valve shifts to direct the combined output of the plasticator and the accumulator to recharge the chamber.

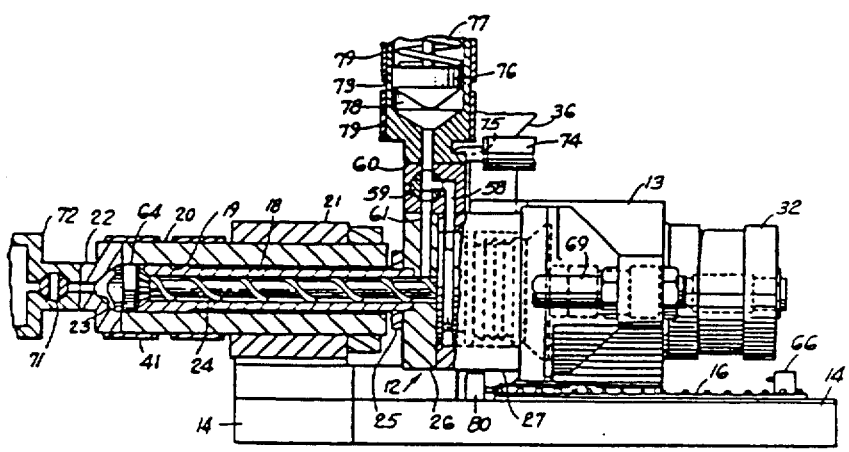

B1 4,557,683

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 29–34:
As should be apparent the length of the screw [need] *needed* to perform the desired operations to plasticate and process the material as well as the length of machine needed to accommodate the reciprocation of the screw dictates that such reciprocating screw injecting molding machines be of considerable length.

AS A RESULT OF REEXAMINATION, IT HAS BEEN DETERMINED THAT:

Claim 4 is cancelled.

Claims 1, 3, 5, 7 and 8 are determined to be patentable as amended.

Claims 2 and 6, dependent on an amended claim, are determined to be patentable.

New claims 9–13 are added and determined to be patentable.

1. Apparatus for injection molding plastic articles including the combination of: a rotary processor for plasticating plastic and polymeric material comprising a rotor mounted for rotation in a housing, the rotor having a plurality of annular channels, which provide moving surfaces of a plurality of annular passages which are closed by a mating surface of the housing, the housing having an inlet through which material to be plasticated is fed into at least one of the passages, and fixed members projecting from the housing into the channels for restraining the material to be acted on by the moving surfaces and to direct the material to successive passages and toward an outlet, and motor means for rotating the rotor for plasticating and otherwise operating on the material fed through the inlet and successive passageways and through the outlet in substantially continuous fashion; an injection unit comprising a barrel, an injector ram reciprocable in the barrel in a first direction to enlarge a chamber at one end of the barrel to receive a predetermined charge of plasticated material and reciprocable in a second direction to force the charge from the *barrel* chamber into a mold, an accumulator comprising a cylinder having [a] *an accumulator* chamber adapted to receive plasticated material from the processor outlet and a piston in the cylinder biased toward a reduced volume condition in the accumulator chamber so as to receive material from the processor and to force material from the accumulator chamber into the barrel chamber; a valve interconnecting said rotary processor, said injection unit, and said accumulator, said valve *communicating with said barrel chamber through a passage downstream from said valve, and said valve* in a first condition connecting the outlet of the processor and the accumulator chamber *through said downstream passage* to the barrel chamber and in a second condition closing off the [barrel chamber] *downstream passage* and connecting the outlet of the processor only to the accumulator chamber; and means effective when the barrel chamber has received a predetermined charge, for driving the injector ram in said [other] *second* direction to force plasticated material from the barrel chamber into the mold whereby said valve in said first condition provides for flow of material *through said downstream passage* to said barrel from both said processor and said accumulator during receiving of a charge of material in said barrel chamber, and said valve in said second condition provides for flow of material only to said accumulator during reciprocation of said ram to force the charge of material into a mold and thereby allow substantially continuous operation of said rotary processor during operation of the apparatus.

3. Apparatus according to claim 1 in which the valve is responsive to a predetermined charge being received in the barrel chamber to close off the barrel chamber and to direct the output of the processor to the accumulator and in which the ram is driven to eject the material from the *barrel* chamber.

5. Apparatus according to claim 1 in which the ram is carried by a bracket mounted for reciprocation on [the] *a* base and the processor is fixed on a bracket in which the barrel is secured, the bracket being fixed to the base.

7. Apparatus according to claim 3 in which the valve is operable at the end of the injection stroke of the ram to return the valve to its [initial position] *first condition* to connect the output of the accumulator and the processor *through said passage downstream from the valve* to the barrel chamber to recharge the *barrel* chamber.

8. Apparatus according to claim 5 in which the ram carrying bracket is connected to piston and cylinder means which is responsive to filling of the barrel chamber with a predetermined charge to cause the valve to close off the chamber from the processor and accumulator and to cause the piston and cylinder means to drive the ram to eject the material from the *barrel* chamber.

9. *Apparatus for injection molding plastic articles including the combination of: a rotary processor for plasticating plastic and polymeric material comprising a rotor mounted for rotation in a housing, the rotor having a plurality of annular channels, which provide moving surfaces of a plurality of annular passages which are closed by a mating surface of the housing, the housing having an inlet through which material to be plasticated is fed into at least one of the passages, and fixed members projecting from the housing into the channels for restraining the material to be acted on by the moving surfaces and to direct the material to successive passages and toward an outlet, and motor means for rotating the rotor for plasticating and otherwise operating on the material fed through the inlet and successive passageways and through the outlet in substantially continuous fashion; an injection unit comprising a barrel, an injector ram reciprocable in the barrel in a first direction to enlarge a chamber at one end of the barrel to receive a predetermined charge of plasticated material and reciprocable in a second direction to force the charge from the chamber into a mold; an accumulator comprising a cylinder having a chamber adapted to receive plasticated mate-* rial from the processor outlet and a piston in the cylinder biased toward a reduced volume condition in the accumulator chamber so as to receive material from the processor and to force material from the accumulator chamber into the barrel chamber; a valve interconnecting said rotary processor, said injection unit, and said accumulator, said valve in a first condition connecting the outlet of the processor and the accumulator chamber to the barrel chamber and in a second condition closing off the barrel chamber and connecting the outlet of the processor only to the accumulator chamber; and means effective when the barrel chamber has received a predetermined charge, for driving the injector ram in said second direction to force plasticated material from the barrel chamber into the mold whereby said valve in said first condition provides for flow of material to said barrel from both said processor and said accumulator during receiving of a charge of material in said barrel chamber, and said valve in said second condition provides for flow of material only to said accumulator during reciprocation of said ram to force the charge of material into a mold, said ram comprising an elongate screw in a sleeve which reciprocates in the barrel, the sleeve being secured to the processor so as to reciprocate in unison therewith and the rotor and screw being rotated simultaneously, the processor being mounted on a bracket guided for reciprocation on a base.

10. Apparatus according to claim 2 in which the sleeve is secured to the processor so as to reciprocate in unison therewith and the rotor and screw are rotated simultaneously, the processor being mounted on a bracket guided for reciprocation on a base.

11. A system for injecting plasticated material into a mold comprising: a rotary processor for plasticating plastic and polymeric material comprising a rotor mounted for rotation in a housing, the rotor having a plurality of annular channels, which provide moving surfaces of a plurality of annular passages which are closed by a mating surface of the housing, the housing having an inlet through which material to be plasticated is fed into at least one of the passages, and fixed members projecting from the housing into the channels for restraining the material to be acted on by the moving surfaces and to direct the material to successive passages and toward an outlet, and motor means for rotating the rotor for plasticating and otherwise operating on the material fed through the inlet and successive passageways and through the outlet in substantially continuous fashion; an injection unit comprising a barrel having one end communicating directly with a discharge nozzle for feeding a mold, an injector ram reciprocable in the barrel in a first direction to enlarge an enlargeable chamber at said one end of the barrel to receive a predetermined charge of plasticated material and reciprocable in a second direction to force the charge from the enlargeable barrel chamber directly through said discharge nozzle into a mold; an accumulator comprising a cylinder having an accumulator chamber adapted to receive plasticated material from the processor outlet and a piston in the cylinder movable toward an enlarged volume condition in the accumulator chamber so as to receive material from the processor and biased toward a reduced volume condition in the accumulator chamber to force material from the accumulator chamber into the enlargeable barrel chamber; valve means connected to a valve outlet passage downstream from said valve means, said valve outlet passage communicating directly into said enlargeable barrel chamber at the end thereof having said discharge nozzle; said valvemeans interconnecting said outlet of said rotary processor, said accumulator chamber and said valve outlet passage; said valve means in a first condition connecting the outlet of the processor and the accumulator chamber through said valve outlet passage directly into said enlargeable barrel chamber for feeding a predetermined charge of plasticated material directly into said enlargeable barrel chamber at the end thereof having said discharge nozzle, and said valve means in a second condition closing off said valve outlet passage and connecting the outlet of the processor only to the accumulator chamber; and ram drive means effective when the enlargeable barrel chamber has received the predetermined charge and said valve outlet passage is closed off for driving the injector ram in said second direction to force the predetermined charge of plasticated material from said enlargeable barrel chamber directly through said discharge nozzle into a mold, thereby enabling substantially continuous operation of said rotary processor during operation of the system.

12. A system according to claim 11 in which the ram is carried by a bracket mounted for reciprocation on a base, and the rotary processor is fixed on bracket means in which the barrel is secured, said bracket means being fixed to the base.

13. A system according to claim 12 in which said valve means and said accumulator are also fixed on said bracket means in which the barrel is secured.

* * * * *